United States Patent
Faryar et al.

(10) Patent No.: US 6,625,215 B1
(45) Date of Patent: Sep. 23, 2003

(54) METHODS AND APPARATUS FOR CONTEXT-BASED INTER/INTRA CODING MODE SELECTION

(75) Inventors: Alireza Farid Faryar, Fair Haven, NJ (US); Moushumi Sen, West End, NJ (US); Kyeong Ho Yang, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/326,872

(22) Filed: Jun. 7, 1999

(51) Int. Cl.$^7$ ................................................. H04B 1/66
(52) U.S. Cl. ............................ 375/240.14; 375/240.13; 348/409; 348/415; 348/412
(58) Field of Search ............................ 375/240.14, 240, 375/240.13; 348/405, 419, 415, 409, 390, 403–404, 407, 420, 422, 412

(56) References Cited

U.S. PATENT DOCUMENTS

| | | | | |
|---|---|---|---|---|
| 5,543,846 A | * | 8/1996 | Yagasaki | 348/415 |
| 5,721,588 A | * | 2/1998 | Fujiwara et al. | 348/402 |
| 5,777,680 A | * | 7/1998 | Kim | 348/405 |
| 5,825,680 A | * | 10/1998 | Wheeler et al. | 364/761 |
| 5,907,360 A | * | 5/1999 | Kessler et al. | 348/398 |
| 5,940,131 A | * | 8/1999 | Miyaji et al. | 348/416 |

OTHER PUBLICATIONS

J.R. Jain et al., "Displacement Measurement and Its Application in Interframe Image Coding," IEEE Transactions on Communications, vol. COM–29, No. 12, pp. 1799–1808, Dec. 1981.

R. Srinivasan et al., "Predictive Coding Based on Efficient Motion Estimation," IEEE Transactions on Communications, vol. COM–33, No. 8, pp. 888–896, Aug. 1985.

N.D. Memon et al., "Lossless Compression of Video Sequences," IEEE Transactions on Communications, vol. 44, No. 10, pp. 1340–1345, Oct. 1996.

* cited by examiner

Primary Examiner—Chris Kelley
Assistant Examiner—Shawn S. An

(57) ABSTRACT

A technique is provided for use in a video processing system for selecting between an inter-frame coding mode and an intra-frame coding mode when processing a current portion of a video sequence. The technique includes identifying previously reconstructed samples associated with the current portion from a current frame and a reference frame of the video sequence. Then, a selection is made whether to implement the inter-frame coding technique or the intra-frame coding technique on the current portion based on comparisons associated with the previously reconstructed samples. The technique may be implemented in both a video encoder and a video decoder. As a result, the encoder does not need to transmit coding mode-related overhead information to a corresponding decoder. By way of example, the invention may be implemented in a pixel-based coding system or a block transform-based coding system.

29 Claims, 6 Drawing Sheets

METHODS AND APPARATUS FOR CONTEXT-BASED INTER/INTRA CODING MODE SELECTION

This invention was made with U.S. Government support under NIST cooperative agreement no. 70NANB7H3051 (proposal no. 97-04-0020) entitled: "Enabling Technology for a Digital Video Optical Tape Recorder of High Definition Motion Imagery." The U.S. Government may have certain rights in this invention.

CROSS REFERENCE TO RELATED APPLICATIONS

The present application is related to U.S. patent applications respectively entitled: "Methods And Apparatus For Motion Estimation Using Causal Templates," and "Methods And Apparatus For Context-based Perceptual Quantization," both filed concurrently herewith.

FIELD OF THE INVENTION

The invention relates to video compression and, more particularly, to context-based coding mode selection methods and apparatus in a video compression system.

BACKGROUND OF THE INVENTION

Hybrid coding methods are widely used to efficiently represent video sequences, where temporal prediction is first performed to reduce the temporal redundancy in a video sequence and the resultant prediction errors are then encoded, e.g., see: *Draft of MPEG-2: Test Model 5*, ISO/IEC JTC1/SC29/WG11, April 1993; *Draft of ITU-T Recommendation H.263*, ITU-T SG XV, Dec. 1995; A. N. Netravali and B. G. Haskell, *Digital Pictures: Representation, Compression, and Standards*, $2^{nd}$ Ed., Plenum Press, 1995; and B. Haskell, A. Puri, and A. N. Netravali, "Digital Video: An Introduction to MPEG-2," Chapman and Hall, 1997, the disclosures of which are incorporated herein by reference. The temporal prediction is usually very helpful in the compression of video signals. However, it is also possible for the temporal prediction error to be more difficult to encode than the original signal, especially in regions of the frame where temporal prediction does not perform very well. For example, an encoder could fail to find a good temporal prediction block when the real motion is out of the search range. Therefore, many video coders adopt an inter/intra adaptive coding approach, where inter-frame coding is applied to the areas (blocks or pixels) where the temporal prediction is likely to provide a better compression and, otherwise, intra-frame coding is applied. Hence, there are two operational modes, inter-frame coding mode and intra-frame coding mode. The process of deciding which coding mode will be used to encode each block (or pixel) is referred to as coding mode selection.

However, it is known that the conventional coding mode selection approach requires overhead bits representing coding mode information to be sent to the decoder since the samples in the current frame used for coding mode selection are not available at the decoder, most notably as will be explained, the current block or sample. This overhead burden can be extremely heavy when mode selection is performed on a small block or on a pixel basis. Thus, it would be highly advantageous to have a coding mode selection method which does not require coding mode information to be transmitted to a decoder.

SUMMARY OF THE INVENTION

The present invention provides for coding mode selection for a video sequence wherein the decision to perform inter-frame coding or intra-frame coding on a current portion of the video sequence is based only on previously reconstructed samples associated with the video sequence. Advantageously, an encoder employing the methodologies of the invention is not required to transmit coding mode overhead information to a corresponding decoder.

In one aspect of the invention, a method of selecting a coding mode in a video processing system for processing a current portion of a video sequence includes identifying previously reconstructed samples associated with the current portion from a current frame and a reference frame of the video sequence. Then, a selection is made between inter-frame coding and intra-frame coding for processing the current portion based on comparisons associated with the previously reconstructed samples. The comparisons are dependent on the particular application employing the methodology of the invention. By way of example, the invention may be implemented in a pixel-based predictive coding system or a block transform-based coding system. In the former embodiment, the current portion is a pixel and intensity values associated with previously reconstructed samples are used in the comparison. In the latter embodiment, the current portion is a block and dc and ac coefficients associated with previously reconstructed blocks are used in the comparison. Further, the previously reconstructed samples are preferably in sets of samples referred to as templates. A template having only previously reconstructed samples is called a causal template.

Since coding mode selection at an encoder is accomplished according to the invention using sets or templates comprising only previously reconstructed samples, it is to be appreciated that such sets or templates are also available at the decoder. As a result, an encoder of the invention does not need to provide coding mode information to the corresponding decoder since the decoder can independently perform the same decision process using the same causal sets or templates used at the encoder. Advantageously, transmission bandwidth and/or storage capacity is saved.

DETAILED DESCRIPTION OF PREFERRED EMBODIMENTS

As used herein, the term "video" or "video sequence" should be understood to include any frame or field sequence which is in a form suitable for encoding in accordance with standards such as, for example, H.261, H.263, Motion-JPEG, MPEG-1 and MPEG-2. The term "block" as used in accordance with the invention is intended to include not only macroblocks as defined in the above-noted compression standards, but more generally, any grouping of pixel elements in a video frame or field. It is to be appreciated that such a grouping may include a set of pixels or a single pixel. Embodiments that specifically implement pixel-based processing and block-based processing (e.g., 8×8 element block) will be so noted. Further, the meaning of the term "sample" as used in accordance with the invention refers to a pixel or some subset of information, e.g., component, associated with a pixel. Still further, the term "context" refers to a value used to describe a current block or pixel's surroundings which, according to the invention, is derived from previously reconstructed samples. It is to be appreciated that the coding mode selection techniques of the invention are performed in both a video encoder and a corresponding video decoder so that coding mode selection-related data does not need to be transmitted from the encoder to the decoder.

Figure 1:
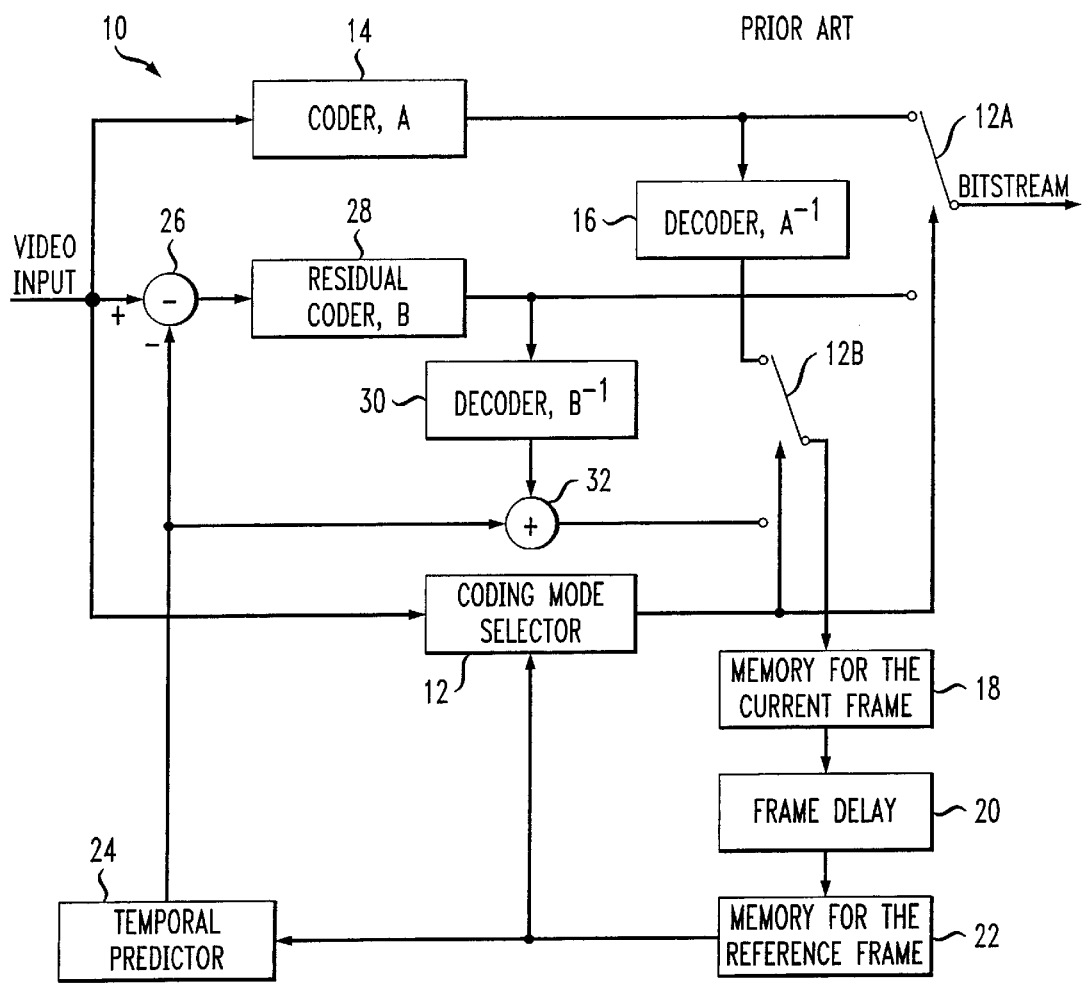
FIG. 1 is a block diagram of a video encoder implementing conventional coding mode selection.
Figure 2A:
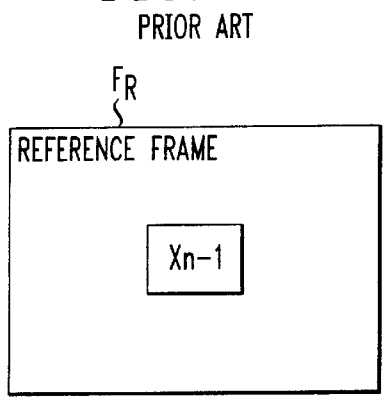
FIG. 2A and 2B are diagrams illustrating the portions of a reference frame and a current frame, respectively, used to perform conventional coding mode selection.
Figure 2B:
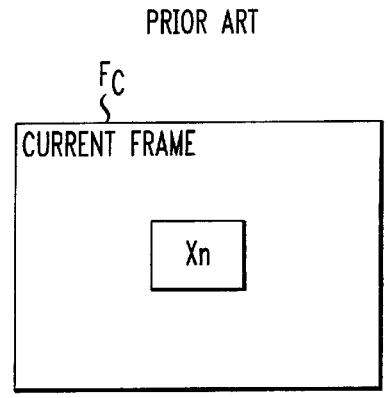

Referring initially to FIGS. 1, 2A and 2B, a conventional approach to performing inter/intra coding mode selection is shown. A conventional video encoder 10 includes a coding mode selector 12 which operatively controls whether the entire current block of a current frame is encoded and transmitted to a decoder (intra-frame coding) or whether a temporal prediction error generated for the current block is encoded and transmitted to a decoder (inter-frame coding). The coding mode selector 12 employs switches 12A and 12B to control implementation of the selection.

In the case of intra-frame coding, coder 14 encodes the current block, received directly from the video input, using a coding technique A. The encoded block is then reconstructed by decoder 16 using the inverse of coding technique A, i.e., $A^{-1}$. As is known, the reconstructed block is stored in current frame memory 18 so as to form a reconstructed representation of the current frame. A reference frame memory 22 is provided which stores the reconstructed representation of the frame that preceded the current frame. The frame delay block 20 shown interposed between the current memory 18 and a reference memory 22 merely indicates that there is a one frame period delay between blocks in the current frame memory and blocks in the reference frame memory.

In the case of inter-frame encoding, residual coder 28 encodes a temporal prediction error signal received from the signal subtractor 26, using a coding technique B. As is known, the signal subtractor generates the prediction error signal by subtracting a predictor signal, generated by temporal predictor 24 as is known, from the current block. The prediction error represents the difference between the current block and a block from the reference frame intended to best estimate the current block. The current block is then reconstructed by first reversing the coding technique B applied to the prediction error signal in decoder 30 using inverse coding technique $B^{-1}$ and then adding its output back to the predictor signal to yield the current block. The reconstructed block Is then stored in the current frame memory during the processing of the current frame. The reconstructed current frame is then stored in the reference frame memory, for use by the temporal predictor, just prior to the processing of the next frame.

It is important to note that, as is evident in FIG. 1, the conventional coding mode selector 12 receives as input both the current frame including the current block, directly from the video input, and the reference frame from reference frame memory 22. Such coding mode selector uses both the current block and a block in the reference frame to make the coding mode selection. For instance, the selector may use a block in the reference frame at the same spatial location as the current block or the motion compensated block if motion estimation/compensation is employed. As shown in FIGS. 2A and 2B, $X_n$ represents the current block in the current frame $F_C$ and $X_{n-1}$ represents the block in the reference frame $F_R$ that spatially corresponds to the current block. From these inputs, the mode selector decides whether to perform inter-frame coding or intra-frame coding. For example, by comparing the current block to a spatially corresponding block in the reference frame, a determination is made as to whether it would be better to encode the current block directly (intra-frame) or the temporal prediction error associated with the current block (inter-frame). Regardless of which block is used from the reference frame, the conventional selector must also use the current block in order to make the mode selection determination.

It is to be appreciated that, to properly decode the current block, the decoder must know which coding mode was employed at the encoder. That is, the conventional decoder must obtain some knowledge of which encoding technique was employed at the encoder, A or B, before being able to decode the current block with the corresponding decoding technique $A^{-1}$ or $B^{-1}$. However, because the conventional technique uses the current block to make coding mode decisions for the current block, the prior art decoder can not independently make the same determination since it has not yet processed the current block. Disadvantageously, in the conventional coding system, the encoder must therefore transmit coding mode information to the decoder, along with the signal representing the encoded block, to let the decoder know how to decode the transmitted signal.

Figure 3:
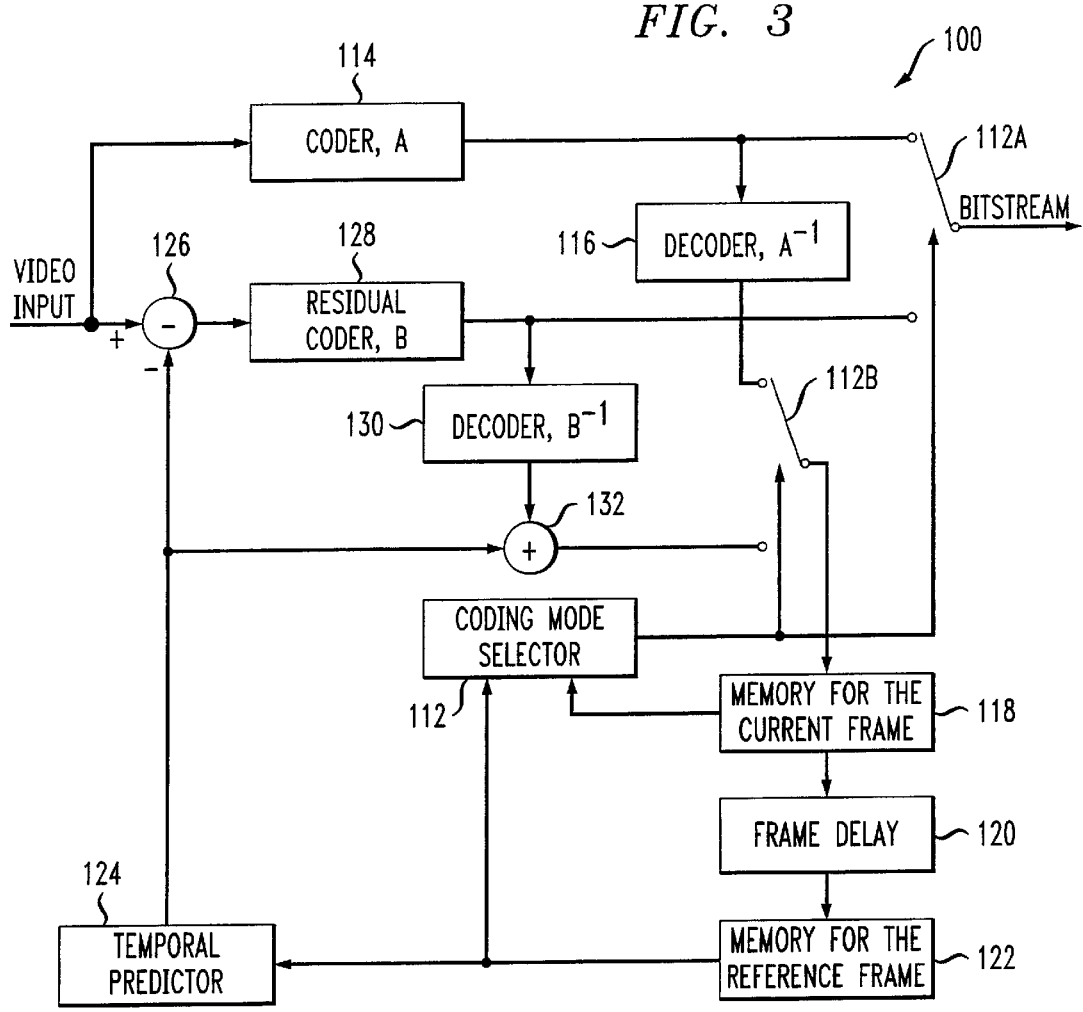
FIG. 3 is a blocks diagram of a video encoder implementing coding mode selection according to an exemplary embodiment of the present invention.

In a significant departure from such prior art coding systems, an encoder of the present invention performs coding mode selection using only previously reconstructed samples. That is, rather than using the current block to make the inter/intra frame coding mode decision, as in prior art encoders, a video encoder of the invention uses previously reconstructed samples that are adjacent to the current block to make the decision. These previously reconstructed samples from the current frame are used with appropriate previously reconstructed samples from a reference frame in comparisons, as will be explained, to make the inter-frame coding versus intra-frame coding decision. Since the decision process is made based only on values that have already been reconstructed, the encoder does not need to transmit any coding mode overhead information to a decoder. That is, a corresponding decoder employing the same coding mode selection process can independently make the same determination that was made at the encoder for the current block. As a result, transmission bandwidth and/or storage capacity is saved FIG. 3 depicts a block diagram of a video encoder implementing context-based coding mode selection according to an exemplary embodiment of the invention. As is evident, the encoder 100 of the invention includes similar functional components as the encoder 10 of FIG. 1. However, unlike the selector 12 of encoder 10, it is important to note that the coding mode selector 112 of the encoder of the invention is not connected directly to the encoder video input but instead is connected to the current frame memory 118. In this way, as will be explained below, the coding mode selector receives only previously reconstructed values from the current frame memory and the reference frame memory in order to make the coding mode decision.

Given the above interconnectivity of components in the exemplary encoder 100, a description of a corresponding encoding operation will now follow. It is to be appreciated that the encoder 100 may be employed to encode a video sequence on a block by block basis. However, as used generally herein, the term "block" may be a pixel, a set of pixels or some other portion of a frame. An example of pixel-based encoding will be explained in the context of FIGS. 5A and 5B, while an example of block transform-based encoding will be explained in the context of FIGS. 6A and 6B.

Figure 4A:
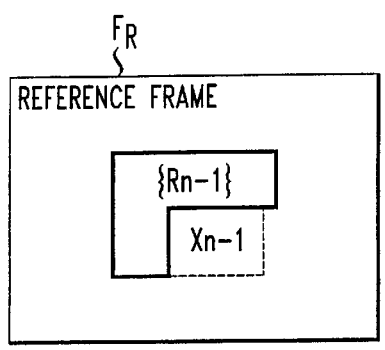
FIGS. 4A and 4B are diagrams of exemplary causal templates for a reference frame and a current frame, respectively, used to perform coding mode selection according to the present invention.
Figure 4B:
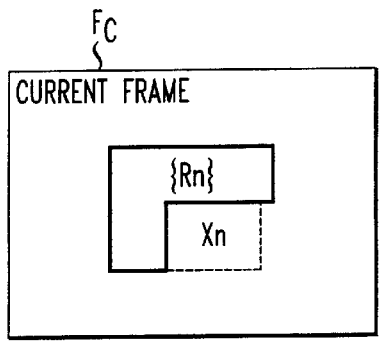

The concept of using only previously reconstructed samples is generally illustrated, by way of example, in FIGS. 4A and 4B. FIGS. 4A and 4B respectively show sets of previously reconstructed samples that may be used to make the coding decision. It is to be noted that the sets may be in the form of templates. Templates that include only previously reconstructed samples are referred to herein as causal templates. $X_n$ (FIG. 4B) is the current block in the current frame $F_C$ to be encoded and $X_{n-1}$ (FIG. 4A) is a spatially corresponding block in the reference frame $F_R$. $X_{n-1}$ may alternatively be the motion compensated block. As shown, a causal template $R_n$ is formed from samples adjacent to the current block $X_n$ in the current frame $F_C$. It is assumed that samples of the current frame are processed, e.g., encoded and reconstructed, from the upper left hand corner of the frame to the lower right hand corner of the frame. Thus, template $R_n$ only includes samples from the current frame which have already been encoded and reconstructed. Similarly, a template $R_{n-1}$ is formed from samples adjacent to the block $X_{n-1}$ in the reference frame $F_R$ which, itself, only includes previously reconstructed samples. It is to be understood that reconstructed samples in block $X_n$ may then be part of the causal template used in the next encoding iteration for the next block.

Figure 5A:
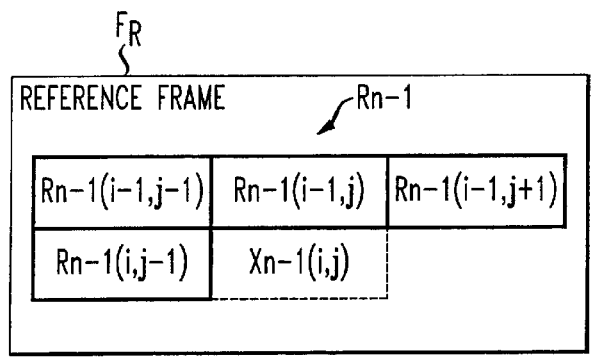
FIGS. 5A and 5B are diagrams of exemplary causal templates for a reference frame and a current frame, respectively, used to perform coding mode selection according to the present invention in conjunction with pixel-based predictive coding.
Figure 5B:
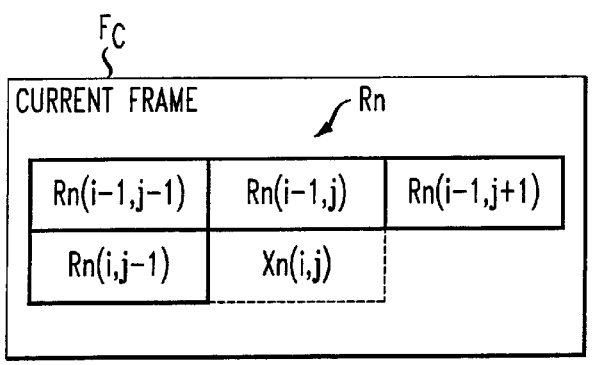
Figure 6A:
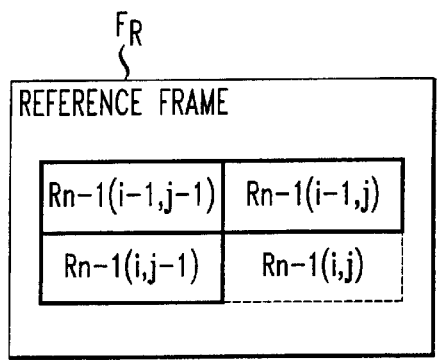
FIGS. 6A and 6B are diagrams of exemplary causal templates for a reference frame and a current frame, respectively, used to perform coding mode selection according to the present invention in conjunction with block transform-based coding.
Figure 6B:
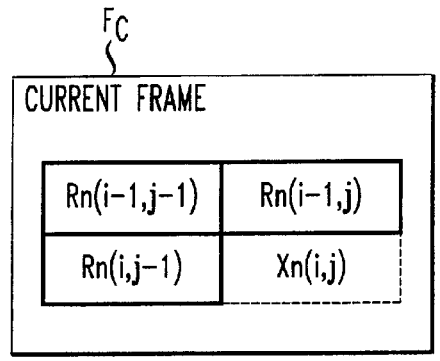

As will be illustrated in examples shown in FIGS. 5A and 5B and in FIGS. 6A and 6B, previously reconstructed samples in the causal template $R_n$ and previously reconstructed samples in the causal template $R_{n-1}$ are used in comparisons to make the coding mode decision. Since such previously reconstructed samples are available at a corresponding decoder at the time the current block is to be decoded, i.e., since they have already been decoded and stored in decoder memory, no coding mode overhead information needs to be transmitted and/or stored with the encoded bitstream.

Referring now, to FIGS. 5A and 5B in the context of the encoder 100, an exemplary operation of coding mode selection according to the invention in conjunction with pixel-based predictive coding will now be explained. It is to be appreciated that in this example, the current portion of the current frame to be processed is a single pixel $X_n$. Thus, the corresponding portion of the reference frame is also a single pixel $X_{n-1}$. The encoder 100 receives an input video signal. A decision must be made by the encoder as to whether the encoder will encode $X_n$ by coding technique A (via coder 114) or encode a temporal prediction error associated with $X_n$ by residual encoding technique B (via encoder 128). This decision is made by the coding mode selector 112. The selector forms templates $R_n$ and $R_{n-1}$, respectively, from the current frame memory 118 and the reference frame memory 122 and compares certain pixel intensity values to certain other pixel intensity values wherein the pixel intensity values are associated with, the pixels in the templates. In this example, where mode selection is performed on a pixel basis, the values of the four previously reconstructed samples with respect to pixel $X_n$ in the current frame and $X_{n-1}$ in the reference frame are used for mode selection. Thus, in the case of the selector 112 forming and then using the causal templates $R_n$ and $R_{n-1}$ shown in FIGS. 5A and 5B, the mode selection may be made based on a comparison of intra-frame and inter-frame differences as follows:

intra_difference=|Rn(i−1, j+1)−Rn (i−1, j)|+|Rn(i−1, j)−Rn (i−1, j−1)|+|Rn(i−1, j−1)−Rn (i, j−1)|;

inter_difference=|Rn(i−1, j+1)−Rn−1

(i−1, j+1)|+|Rn(i−1, j)−Rn−1

(i−1, j)|+|Rn(i−1, j−1)−Rn−1

(i−1, j−1)|+|Rn (i, j−1)−Rn−1(i−1, j−1)|;

if(inter_difference<intra_difference) inter-frame coding mode;

else intra-frame coding mode.

In the coding mode selection technique described above, |x| is the absolute value of x. Thus, an intra-frame difference value (intra_difference) is calculated, as above, from the four previously reconstructed samples in the current frame, while an inter-frame difference (inter_difference) is calculated, as above, from the four previously reconstructed samples in the current frame and the four previously reconstructed samples in the reference frame. Then, the intra-frame difference value is compared to the inter-frame difference value. If the inter-frame difference value is less than the intra-frame difference value, then inter-frame encoding is performed on pixel $X_n$, otherwise, intra-frame coding is performed. It is to be appreciated that while the templates $R_n$ and $R_{n-1}$ are formed from the four previously reconstructed samples, the templates may be formed with more or less samples. Also, the samples do not necessarily have to be contiguous with respect to the current pixel to be encoded. But it is preferred to use samples (or blocks) which are contiguous to the current block since they have a higher correlation with the current sample than those that are not contiguous.

Based on the mode decision, the selector 112 informs the appropriate coder (114 or 128) and decoder (116 or 130) that it is to encode and decode, respectively, an input signal received thereby. In the case of selection of intra-frame coding, the coder 114 encodes $X_n$ and the selector causes switches 112A to be positioned to allow the output of coder 114 to be output as the bitstream to be transmitted or stored. Also, the decoder 116 decodes the encoded pixel to form a reconstructed sample. The selector causes switch 112B to be positioned to allow the reconstructed current sample to be stored in current frame memory 118 for possible inclusion in the template formed in the mode selection process for the next pixel $X_{n+1}$ to be processed by the encoder.

In the case of selection of inter-frame coding, the coder 128 encodes a temporal prediction error generated for $X_n$ and the selector causes switches 112A to be positioned to allow the output of coder 128 to be output as the bitstream to be transmitted or stored. As is known, to form the temporal prediction error for the current pixel, the temporal predictor 124 generates a predictor signal from the reference frame memory 122 and the predictor signal is subtracted from the current pixel in subtractor 126. The resulting signal is the prediction error representing the difference between the current pixel and the pixel in the reference frame that is intended to best predict the current pixel. It is to be appreciated that the temporal predictor also may perform motion estimation and compensation to exploit the existing temporal correlation between consecutive frames more effectively. Further, the decoder 130 decodes the encoded prediction error and the predictor signal is added back to the decoded prediction error to form a reconstructed sample. The selector causes switch 112B to be positioned to allow the reconstructed current sample to be stored in current frame memory 118 for possible inclusion in the template formed in the mode selection process for the next pixel $X_{n+1}$ to be processed by the encoder. The invention does not specify the coders A and B, instead the coders A and B can be any coding algorithm. For example, the coder A can be implemented by a very complex intra-frame predictor followed by an entropy coding system, and the coder B can be a context-based entropy coding system.

Figure 6C:
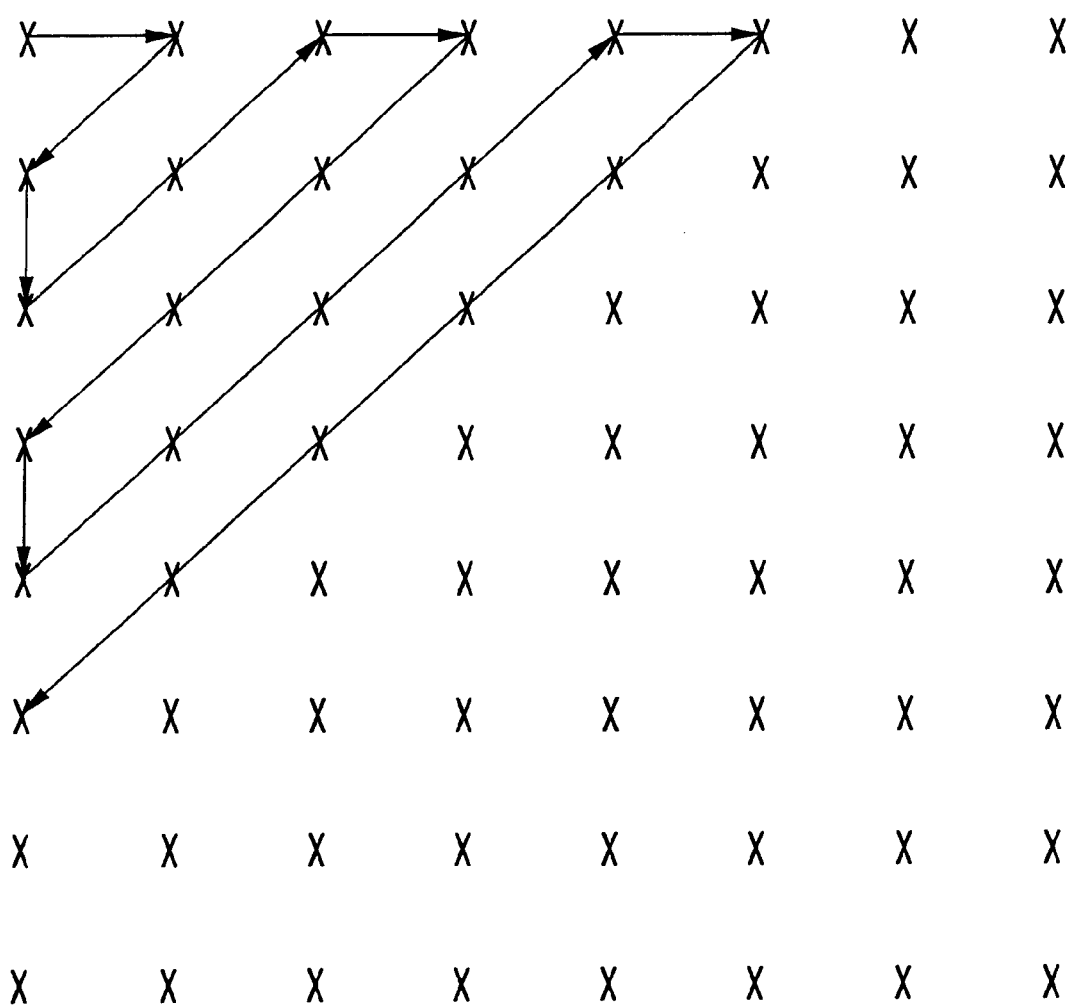
FIG. 6C is a diagram illustrating a zigzag scanning order for block transform coefficients.

Referring now to FIGS. 6A through 6C, the coding mode selection methodology of the present invention will be explained in conjunction with block transform-based coding. For purposes of this embodiment, it is to be assumed that the video input to encoder 100 has been block-transformed and quantized. For example, the mode selection methodology of the invention is applied.after each frame/field has been block-transformed using an 8×8 Hadamard Transform and quantized. However, any other invertible block transform may be employed.

FIGS. 6A and 6B show the causal .templates used for mode selection where $X_n(.)$, $R_n(.)$'s and $R_{n-1}(.)$'s are blocks obtained by applying a block-transform followed by quantization. In this embodiment, a causal template is a set of relative positions of blocks obtained in such a manner, with respect to the current block $X_n(i, j)$ in the current frame $F_C$ and the reconstructed block Rn−1(i, j) in the previous frame $F_R$. The mode selection algorithm of the invention uses reconstructed blocks $R_n$ and $R_{n-1}$ in the current and previous frames, respectively. Particularly, the methodology of the invention decides if the current block of transform coded coefficients should be inter-frame coded, i.e., predicted from a corresponding block in the previous frame $F_R$, or intra-frame coded. In case of an intra-frame coded block, a decision has to be made as to whether the block should be predicted spatially from its causal template in the current frame, or whether it should be coded without any prediction. In the first phase of the inventive mode selection process performed by the coding mode selector 112, we utilize only the dc values of the blocks in the template to determine the coding mode of the dc coefficient $X_n^{dc}(i, j)$ of the current block.

Thus, let:

SumIntra=max$\{|r_n^{dc}(i, j-1)-r_n^{dc}(i-1, j-1)|,|r_n^{dc}(i-1, j-1)-r_n^{dc}(i-1, j)|,|r_n^{dc}(i-1, j)-r_n^{dc}(i, j-1)|\}$ SumInter=max$\{|r_n^{dc}(i, j-1)-r_{n-1}^{dc}(i, j-1)|,|r_n^{dc}(i-1, j-1)-r_{n-1}^{dc}(i-1, j-1)|,|r_n^{dc}(i-1, j)-r_{n-1}^{dc}(i-1, j)|\}$ where $r_n^{dc}(.)$ and $r_{n-1}^{dc}(.)$ are the dc values of the reconstructed blocks in the current and previous frames, respectively. Then, if (SumInter<SumIntra & SumInter<ThreshInter)

$P_n^{dc}(i, j)=r_{n-1}^{dc}(i, j)$ else if (SumIntra<ThreshIntra)

$P_n^{dc}(i, j)=\text{avg}\{r_n^{dc}(i, j-1), r_n^{dc}(i-1, j-1), r_n^{dc}(i-1, j)\}$ else
code $x_n^{dc}(i, j)$ directly.

where ThreshIntra and ThreshInter are suitably selected threshold values and $p_n^{dc}(i, j)$ is the predictor for $x_n^{dc}(i, j)$. If $X_n^{dc}(i, j)$ is not predicted, spatially or temporally, then the remaining 63 ac coefficients of the block, $x_n^k(i, j)$, k=1,2, . . . 63, are also not predicted. On the other hand, if we choose to predict $x_n^{dc}(i, j)$, then we enter the second phase of the inventive method: selecting the coding mode of $X_n^k(i, j)$, k=1,2, . . . 63. The coding mode of an ac coefficient $x_n^k(i, j)$ depends on the scan order of the coefficients in the block and on the magnitude of the prediction error $e_n^{k-1}(i, j)$ of the immediately preceding coefficient. The scan order used is the standard zigzag scanning order shown in FIG. 6C. If $x_n^k(i, j)$ is the $k^{th}$ ac coefficient of the current block (in scan order), and $r_n^{k-1}(i, j)$ and $e_n^{k-1}(i, j)$ are the reconstructed and prediction error values, respectively, of the preceding $k-1^{th}$ coefficient, then the coding mode selection method specifies the following:

if (abs($r_n^{k-1}(i, j)$)>abs($e_n^{k-1}(i, j)$))
    predict $X_n^k(i, j)$
else
    code $x_n^m(i, j)$ directly, m=k, k+1, . . . 63 where k=1,2, . . . ,63. Each ac coefficient $x_n^k(i, j)$, k=1,2, . . . ,63, if predicted, uses the same type of prediction, spatial or temporal, as the dc coefficient $x_n^{dc}(i, j)$ of the block being processed. Note that if at any point in the process we determine that $X_n^k(i, j)$ need not be predicted from a previously reconstructed coefficient, then the remaining coefficients in the block, $x_n^m(i, j)$, m=k+1, k+2, . . . , 63 are also not predicted, but coded directly as PCM (pulse code modulated) values.

It is to be understood that at every stage in the coding mode selection process of the invention, the decoder always has access to the same information as the encoder, and both arrive at identical decisions about the coding mode selection for each transform block negating the need for sending any extra bits indicating the coding mode used in each block.

Figure 7:
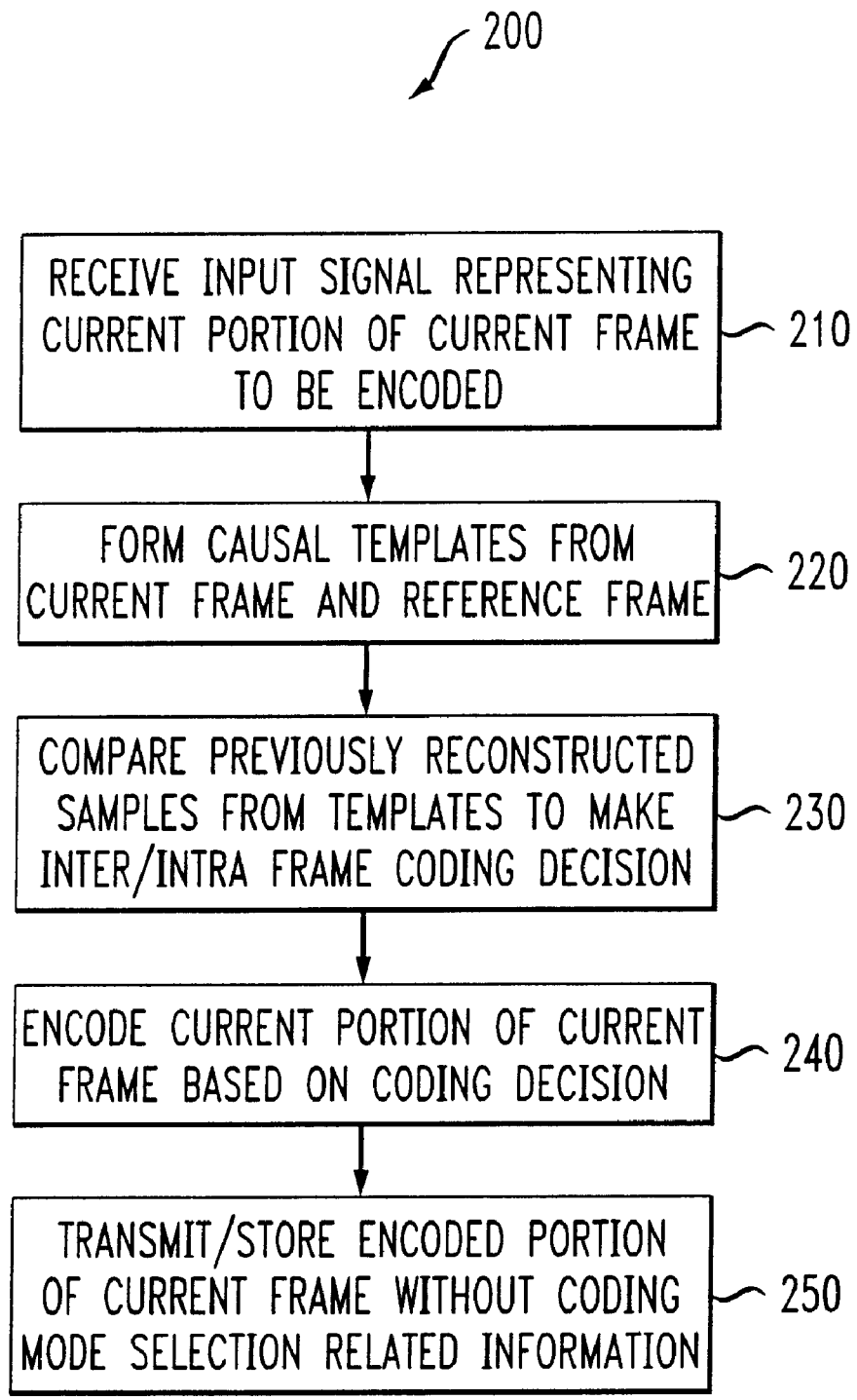
FIG. 7 is a flow diagram illustrating coding mode selection according to an exemplary embodiment of the present invention.

Referring now to FIG. 7, a general flow diagram of an embodiment of a coding mode selection method 200 according to the invention is shown. In step 210, an input video signal is received which represents the portion of the current frame to be processed. It is to be appreciated that the input signal may be block-transformed and quantized prior to receipt as in the example explained above in the context of FIGS. 6A through 6C. However, the portion of the current frame to be processed does not have to be a typical block (e.g., 8×8 element block) but rather may be a pixel as in the example explained above in the context of FIGS. 5A and 5B.

In step 220, causal templates are formed from previously reconstructed samples taken from the current frame and reference frame memories. Step 230 compares the samples from the templates in a manner prescribed by the particular embodiment, e.g., pixel-based predictive coding or transform-based coding as explained above. In step 240, the current portion of the current frame is then encoded via intra-frame coding or inter-frame coding modes based on the outcome of the comparison in step 230. Advantageously, the encoded portion of the current frame is then transmitted and/or stored for subsequent decoding by a corresponding decoder without coding mode selection information. As explained, since only sets of previously reconstructed samples are used to make the mode selection, the decoder can independently come to the same, decision by performing the same decision process based on the same sets of previously reconstructed samples.

Figure 8:
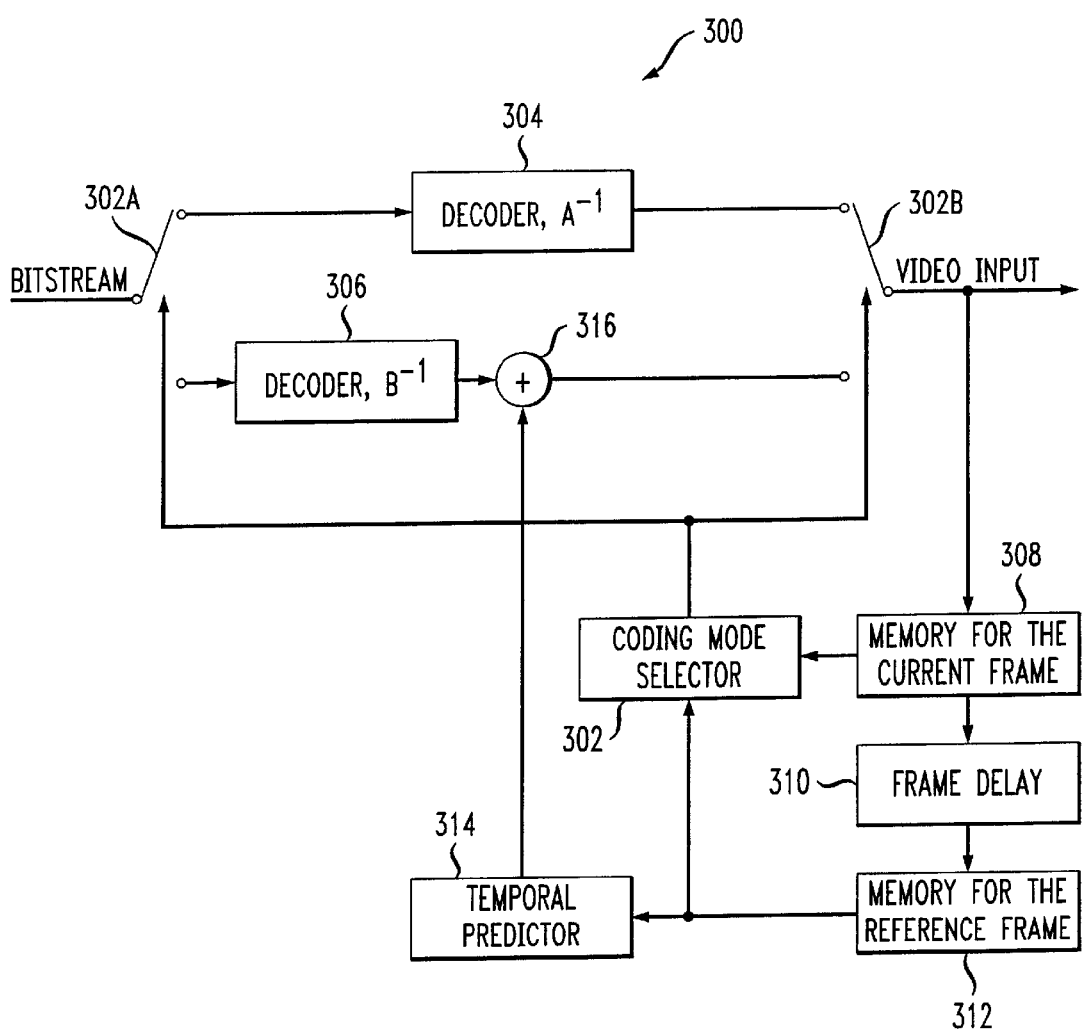
FIG. 8 is a block diagram of a video decoder implementing coding mode selection according to an exemplary embodiment of the present invention.

Referring now to FIG. 8, a block diagram of a decoder implementing context-based coding mode selection according to an exemplary embodiment of the present invention is depicted. The decoder includes elements similar to those employed and described in conjunction, with the encoder 100 of FIG. 3. That is, the decoders 304 and 306 are comparable to decoders 116 and 130 of FIG. 3. Also, current frame memory 308, frame delay 310, reference frame memory 312, temporal predictor 314 and signal adder 316 are comparable to their functional counterparts in FIG. 3. Significantly, a coding mode selector 302, comparable to selector 112 of FIG. 3, receives input from the current frame memory and reference frame memory so as to be able to form the same causal templates, as where used to encode the current signal, in deciding how to decode ($A^{-1}$ or $B^{-1}$) the received current signal.

It is to be appreciated that since the decoder has the previously reconstructed samples used by the encoder stored in its frame memories, the coding mode selector 302 independently performs the same decision process as in the encoder. For example, the selector 302 uses the templates of FIGS. 5A and 5B in the manner described in association therewith to make the mode selection. Alternatively, if block transform coding is implemented, the selector 302 uses the templates of FIGS. 6A and 6B in the manner described in association therewith to make the mode selection.

Once the decision is made, the selector 302 informs the appropriate decoder and causes switches 302A and 302B to be positioned to implement the decision, i.e., select input and output of decoder 304 or 306. If intra-frame decoding is selected, decoder 304 decodes the received bitstream directly and the decoded block is stored in current frame memory 308 as the reconstructed block for use in forming templates to decode the next input portion. If inter-frame coding is selected, meaning the received signal represents a prediction error, then decoder 306 decodes the prediction error signal and a predictor signal generated by temporal predictor 314 is added to the decoded signal in adder 316 to yield the reconstructed block for use in forming templates to decode the next input portion.

Advantageously, as is evident from the above example, the decoder does not require coding mode selection-related data from the encoder because of the inventive way that the mode selection process is performed, i.e., using only previously reconstructed samples. Therefore, transmission bandwidth and/or storage capacity between an encoder and decoder of the invention is saved.

It should be noted that the elements of the encoder 100 and decoder 300 may be respectively implemented using a central processing unit, microprocessor, application-specific integrated circuit or other data processing device in a computer, video transmitter, cable system headend, television set-top box or other type of video signal processor. The central processing unit, microprocessor, application-specific integrated circuit or other data processing device may also have memory associated therewith for storing data and results associated with each element's function when necessary. The invention may be utilized in conjunction with numerous types of video processing or transmission systems. Thus, while the invention is illustrated above using an exemplary video encoding system, it should be understood that the invention is not limited to use with any particular type of video signal format, video encoding standard or encoding system configuration. The invention is instead more generally applicable to any video encoding system which implements intra/inter frame coding mode selection and in which it is desirable to perform such mode selection at an encoder without requiring the transmission of mode selection-related overhead information to a corresponding decoder.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of selecting a coding mode in a video processing system for processing a current portion of a video sequence, the method comprising the steps of:
    identifying previously reconstructed samples associated with the current portion from a current frame and a reference frame of the video sequence; and
    selecting between a first coding mode and a second coding mode for processing the current portion, wherein selection need only be based on comparisons associated with at least a portion of the identified previously reconstructed samples and not on the current portion of the video sequence being processed.

2. The method of claim 1, wherein the previously reconstructed samples form one or more previously reconstructed sample sets.

3. The method of claim 2, wherein the one or more previously reconstructed sample sets are in the form of one or more respective templates.

4. The method of claim 1, wherein the method is performed in a video, encoder of the system and the processing includes encoding the current portion.

5. The method of claim 1, wherein the method is performed in a video decoder of the system and the processing includes decoding the current portion.

6. The method of claim 1, wherein the first coding mode is intra-frame coding and the second coding mode is inter-frame coding.

7. The method of claim 6, wherein the selection step further includes:
    computing an intra-frame difference value from intensity values associated with the previously reconstructed samples from the current frame;
    computing an inter-frame difference value from intensity values associated with the previously reconstructed samples from the current frame and the reference frame; and
    comparing the intra-frame difference value and the inter-frame difference value.

8. The method of claim 7, wherein the selection step further includes choosing the inter-frame coding mode when the inter-frame difference value is not greater than the intra-frame difference value.

9. The method of claim 1, wherein the portion of the video sequence to be processed includes at least one pixel.

10. The method of claim 1, wherein portion of the video sequence to be processed is a block which is block-transformed and quantized.

11. The method of claim 10, wherein the first coding mode is intra-frame coding and the second coding mode is interframe coding and further wherein the current block includes a dc coefficient and the selection step includes:

computing an intra-frame difference value for a dc coefficient from dc values associated with previously reconstructed blocks from the current frame;

computing an inter-frame difference value for the dc coefficient from dc values associated with previously reconstructed blocks from the current frame and the reference frame; and comparing the intra-frame difference value with the inter-frame difference value and a pair of threshold values to make the coding mode selection for the dc coefficient.

12. The method of claim 11, wherein the current block includes ac coefficients and the selection step for an ac coefficient includes comparing a magnitude of a prediction error associated with a preceding ac coefficient of the current block with a corresponding previously reconstructed ac coefficient of the current block to make the coding mode selection for the ac coefficient.

13. Apparatus for selecting a coding mode in a video processing system for processing a current portion of a video sequence, the apparatus comprising:

at least one processing device operative to: (i) identify previously reconstructed samples associated with the current portion from a current frame and a reference frame of the video sequence, and (ii) select between a first coding mode and a second coding mode for processing the current portion, wherein selection need only be based on comparisons associated with at least a portion of the identified previously reconstructed samples and not on the current portion of the video sequence being processed.

14. The apparatus of claim 13, wherein the previously reconstructed samples form one or more previously reconstructed sample sets.

15. The apparatus of claim 14, wherein the one or more previously reconstructed sample sets are in the form of one or more respective templates.

16. The apparatus of claim 13, wherein the coding mode selection is performed in a video encoder of the system and the processing includes encoding the current portion.

17. The apparatus of claim 13, wherein the coding mode selection is performed in a video decoder of the system and the processing includes decoding the current portion.

18. The apparatus of claim 13, wherein the first coding mode is intra-frame coding and the second coding mode is inter-frame coding.

19. The apparatus of claim 18, wherein the selection operation further includes: (i) computing an intra-frame difference value from intensity values associated with the previously reconstructed samples from the current frame, (ii) computing an inter-frame, difference value from intensity values associated with the previously reconstructed samples from the current frame and the reference frame, and (iii) comparing the intra-frame difference value and the inter-frame difference value.

20. The apparatus of claim 19, wherein the selection operation further includes choosing the inter-frame coding mode when the inter-frame difference value is not greater than the intra-frame difference value.

21. The apparatus of claim 13, wherein the portion of the video sequence to be processed includes at least one pixel.

22. The apparatus of claim 13, wherein portion of the video sequence to be processed is a block which is block-transformed and quantized.

23. The apparatus of claim 22, wherein the first coding mode is intra-frame coding and the second coding mode is inter-frame coding and further wherein the current block includes a dc coefficient and the selection operation includes: (i) computing an intra-frame difference value for a dc coefficient from dc values associated with previously reconstructed blocks from the current frame, (ii) computing an inter-frame difference value for the dc coefficient from dc values associated with previously reconstructed blocks from the current frame and the reference frame, and (iii) comparing the intra-frame difference value with the inter-frame difference value and a pair of threshold values to make the coding mode selection for the dc coefficient.

24. The apparatus of claim 23, wherein the current block includes ac coefficients and the selection operation for an ac coefficient includes comparing a magnitude of a prediction error associated with a preceding ac coefficient of the current block with a corresponding previously reconstructed ac coefficient of the current block to make the coding mode selection for the ac coefficient.

25. Apparatus for use in a video processing system, the apparatus comprising:

a context-based coding mode selector for: (i) identifying previously reconstructed samples associated with a current portion from a current frame and a reference frame of a video sequence, and (ii) selecting between a first coding mode and a second coding mode for processing the current portion, wherein selection need only be based on comparisons associated with at least a portion of the identified previously reconstructed samples and not on the current portion of the video sequence being processed.

26. The method of claim 1, wherein the method is performed in a video encoder and a corresponding video decoder of the system such that the video encoder need not provide coding mode information to the corresponding video decoder.

27. The method of claim 1, wherein the method is performed in a video encoder such that coding mode selection is based only on information available at a corresponding video decoder.

28. The apparatus of claim 13, wherein coding mode selection is performed in a video encoder and a corresponding video decoder of the system such that the video encoder need not provide coding mode information to the corresponding video decoder.

29. The apparatus of claim 13, wherein coding mode selection is performed in a video encoder such that coding mode selection is based only on information available at a corresponding video decoder.

* * * * *